US006349217B1

(12) United States Patent
Honcharenko et al.

(10) Patent No.: US 6,349,217 B1
(45) Date of Patent: Feb. 19, 2002

(54) MULTI-MODE/MULTI-RATE FIXED WIRELESS COMMUNICATION SYSTEM

(75) Inventors: Walter Honcharenko, Monmouth Junction, NJ (US); Steve Allpress, Fording Bridge (GB); David Y. Lee, Randolph, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/065,855

(22) Filed: Apr. 24, 1998

(51) Int. Cl.$^7$ ............................................... H04Q 7/20
(52) U.S. Cl. ........................................ 455/562; 455/452
(58) Field of Search ............................ 455/93, 91, 101, 455/102, 423, 450, 452, 561, 562

(56) References Cited

U.S. PATENT DOCUMENTS

| | | | | |
|---|---|---|---|---|
| 5,345,599 A | * | 9/1994 | Paulraj | 455/49.1 |
| 5,544,223 A | * | 8/1996 | Robbins | 379/58 |
| 5,564,072 A | * | 10/1996 | Garcia Aguilera | 455/56.1 |
| 5,615,409 A | * | 3/1997 | Forssen | 455/33.1 |
| 5,765,103 A | * | 7/1998 | Chang | 455/434 |
| 5,781,856 A | * | 7/1998 | Jacobs | 455/403 |
| 5,854,976 A | * | 12/1998 | Garcia Aguilera | 455/411 |
| 5,914,946 A | * | 7/1999 | Avidor | 370/336 |
| 5,991,630 A | * | 11/1999 | Charas | 455/452 |
| 6,016,311 A | * | 1/2000 | Gilbert | 370/280 |
| 6,097,733 A | * | 8/2000 | Basu | 370/468 |

FOREIGN PATENT DOCUMENTS

| | | |
|---|---|---|
| EP | 829985 | 3/1998 |
| WO | WO 95/09490 | 4/1995 |

OTHER PUBLICATIONS

EPO Search Report on EPA 99 30 2871, dated Dec. 5, 2000 (5 pages).

* cited by examiner

Primary Examiner—Thanh Cong Le
Assistant Examiner—Nick Corsaro
(74) Attorney, Agent, or Firm—Law Office of Leo Zucker (57) ABSTRACT

A base station with a defined geographic coverage area in a wireless communication system includes a base receiver, a base transmitter, and a base antenna array. The base antenna array has a base station beamformer arranged to produce (a) a broad antenna beam so that the base station can receive random access signals from subscriber stations at different locations within the coverage area and transmit beacon or acknowledgment signals to the subscriber stations at the different locations, and (b) a narrow antenna beam directed to an acknowledged subscriber station for receiving or transmitting data or traffic signals from or to the subscriber station. A subscriber station includes a subscriber receiver, a subscriber transmitter and a subscriber antenna. The subscriber transmitter is arranged to transmit signals to a system base station on one or more of a number of carriers having a defined frequency spacing within a given spectrum allotment. A first carrier corresponds to a random access channel on which the subscriber station requests access, and at least a second one of the carriers is selected for transmission of data or traffic from the subscriber to the base station.

23 Claims, 8 Drawing Sheets

FIG. 1

FIG. 2
DOWNLINK TRANSMISSION SPECTRUM

FIG. 4

ELEMENT SPACING = λ/2

MULTI-MODE/MULTI-RATE FIXED WIRELESS COMMUNICATION SYSTEM

BACKGROUND OF THE INVENTION

1. Field of the Invention

The present invention is directed to a spectrally efficient, point to multi-point communication system having one or more base stations and a number of system subscriber stations.

2. Discussion of the Known Art

A wireless local loop system known as "AirLoop" is available from the assignee of the present invention. The AirLoop system operates to connect, for example, telephone central switching sites to homes or businesses using fixed wireless equipment, instead of conventional copper wire pairs or "loops". Thus, subscribers within a coverage area of a system base station may enjoy the same features and services offered by existing wired local loop systems, for example, plain old telephone service (POTS) to ISDN.

U.S. Pat. No. 5,448,753 (Sep. 5, 1995) discloses a wide area radio communication system in which central stations direct narrow antenna beams over sub-service areas, to communicate with peripheral stations in such areas during coordinated time intervals.

SUMMARY OF THE INVENTION

According to the invention, a base station having a defined geographic coverage area in a wireless communication system, includes a base receiver, a base transmitter, and a base antenna array coupled to the base receiver and the base transmitter. A base station processor is configured to exchange control and data signals with operating components of the base station. The antenna array is constructed and arranged to operate in a first mode wherein the array steers a narrow antenna beam in the direction of a subscriber station in the coverage area of the base station, for transmitting first downlink signals to the subscriber station and for receiving first uplink signals from the subscriber station, and a second mode wherein the array defines a wide beam for transmitting second downlink signals simultaneously to a number of subscriber stations in the coverage area and for receiving second uplink signals from the subscriber stations.

According to another aspect of the invention, a subscriber station for deployment in a wireless communication system, includes a subscriber receiver, a subscriber transmitter, and a subscriber antenna coupled to the subscriber receiver and the subscriber transmitter. A subscriber station processor is configured to exchange control and data signals with operating components of the subscriber station. The subscriber station transmitter is constructed and arranged to modulate data on a selected number of carriers which carriers are spaced spectrally from one another, to produce simultaneously a corresponding number of first uplink signals for reception at a system base station having a coverage area in which the subscriber station is located. The number of carriers selected for transmission is a function of a rate at which a user desires to transmit data from the subscriber station to the base station.

For a better understanding of the invention, reference is made to the following description taken in conjunction with the accompanying drawing and the appended claims.

DETAILED DESCRIPTION OF THE INVENTION

Figure 1:
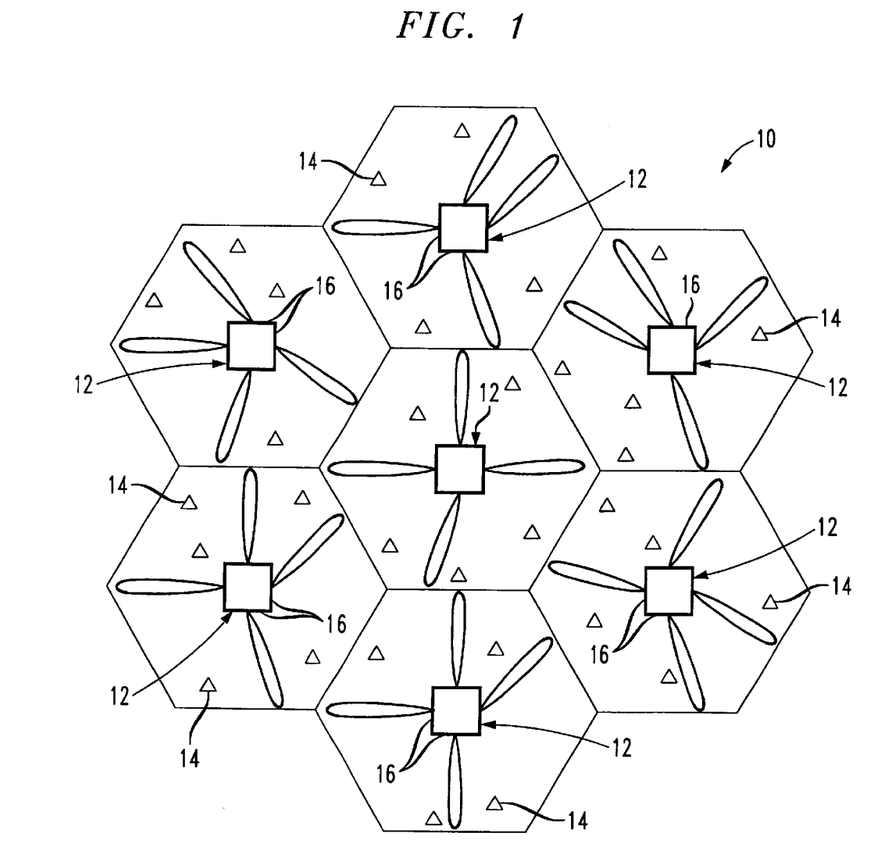
FIG. 1 is a plan view of a communication system according to the invention, showing base and subscriber stations over a wide geographic area.
Figure 2:
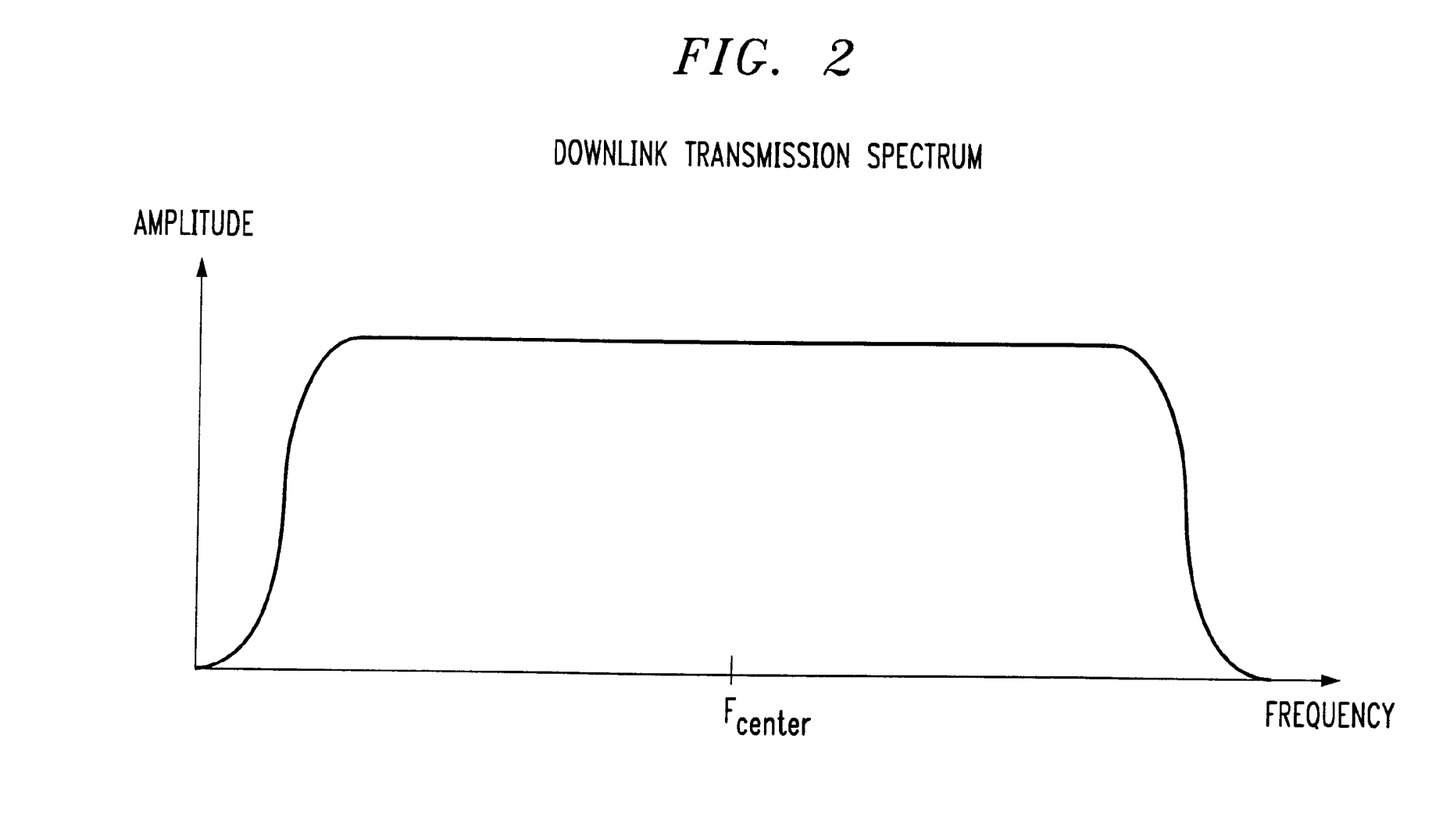
FIG. 2 is a graph of a frequency spectrum allotment for a base station in the system of FIG. 1.

In FIG. 1, a fixed wireless communication system 10 according to the invention provides high rate connectivity for either circuit or packet switched networks, by incorporating both antenna array and block radio techniques. The system 10 embodies two transmission modes. First, a high rate, single carrier scheme shown in FIG. 2 is implemented for downlink transmissions from each base station 12 to covered subscriber stations 14. Second, for uplink transmissions from a subscriber to an assigned base station, a multi-carrier, variable bandwidth scheme is implemented per FIG. 3. Preferably, separate frequency bands are allocated for the uplink and the downlink transmissions. The system 10 also permits a significant degree of frequency reuse to be achieved for each of the base stations and their covered subscribers.

Figure 6:
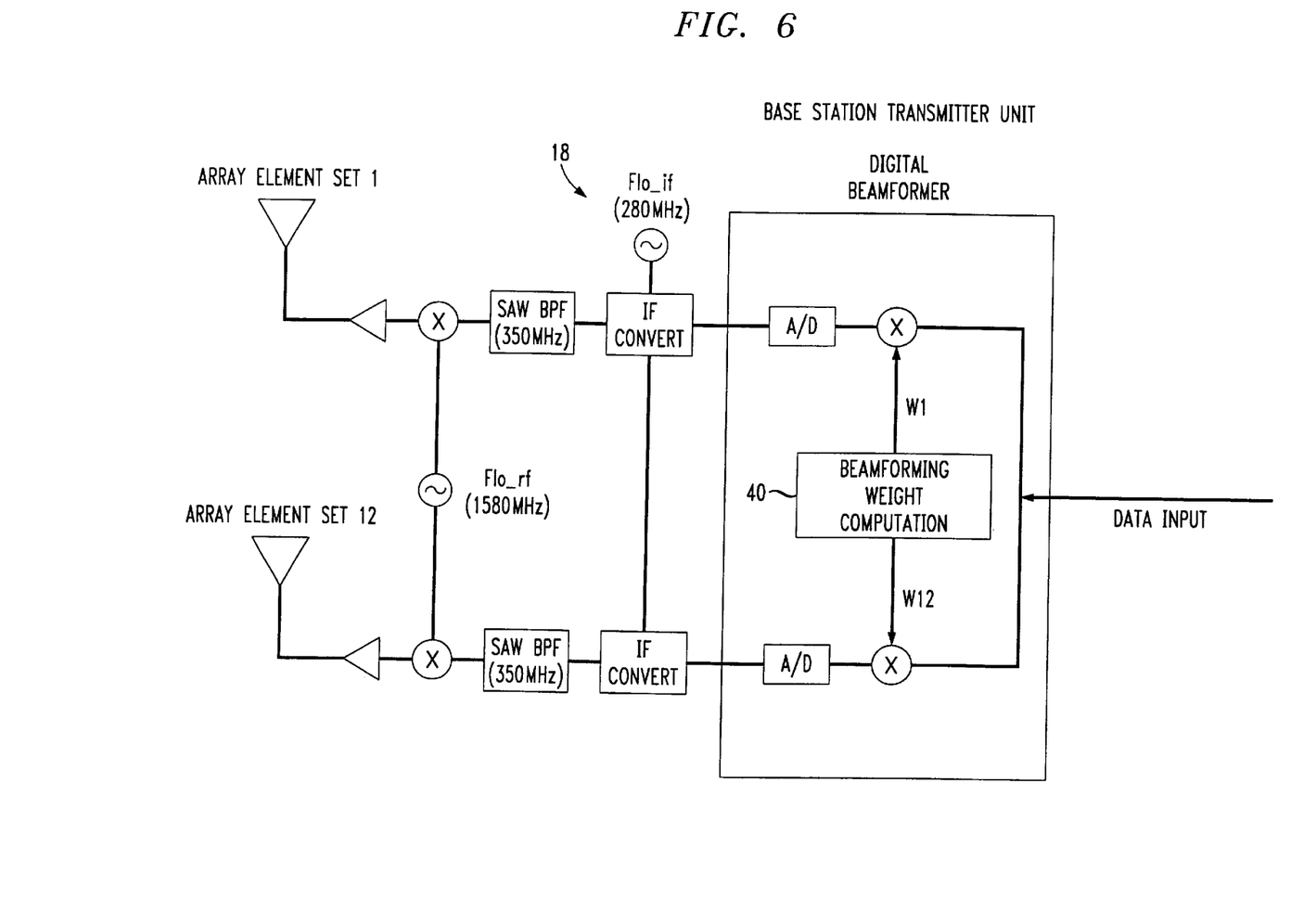
FIG. 6 is a schematic diagram of a base station transmitter.
Figure 7:
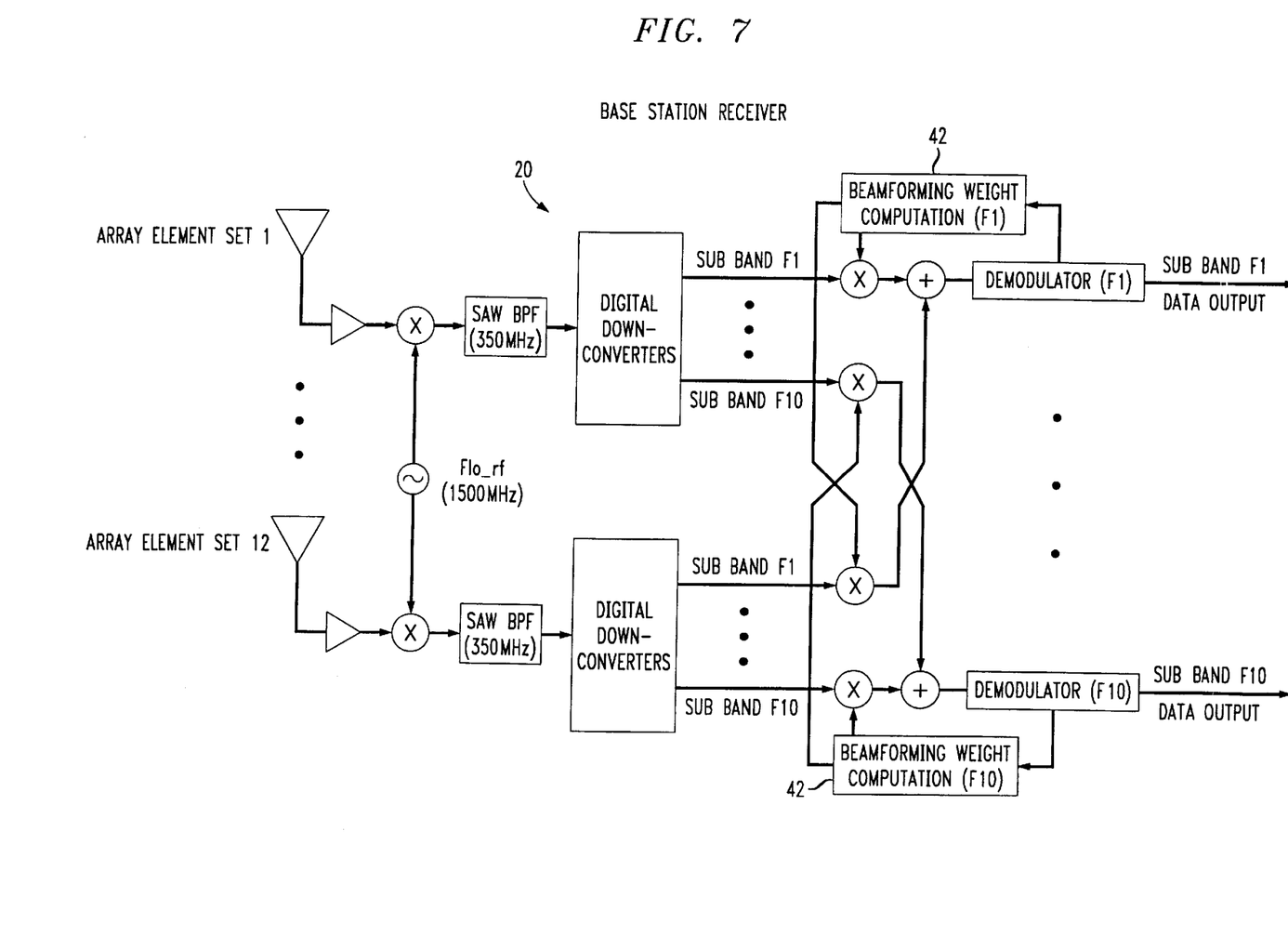
FIG. 7 is a schematic diagram of a base station receiver.
Figure 8:
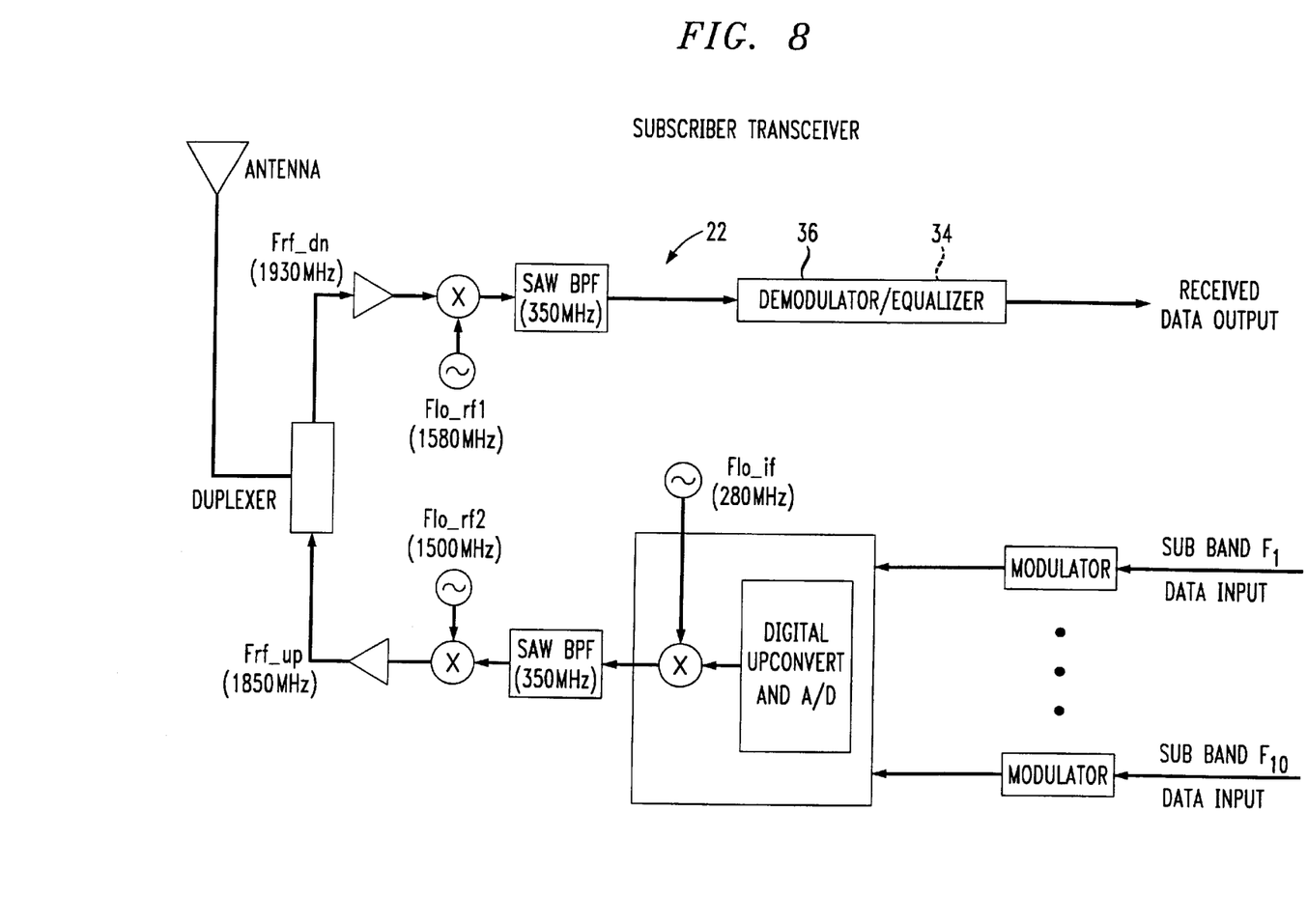
FIG. 8 is a schematic diagram of a subscriber station transceiver (transmitter/receiver) unit.

Each base station 14 is provided with a number of antenna array panels 16. See FIGS. 4 and 5. Each panel 16 is capable of producing either a broad, or a steerable, narrow beam pattern. The base station 14 also has a base transmitter 18 (FIG. 6) and a base receiver 20 (FIG. 7). Each subscriber station includes a patch array antenna, and a transceiver unit 22 shown in FIG. 8. A base station processor exchanges control and data signals with operating components of the base station.

Base stations 14 of the system 10 are deployed on a semi-regular hexagonal grid, to provide coverage over relatively large geographic areas. Preferably, at least three antenna panels provide 360° coverage over each base station's geographic area. Each array panel thus affords a coverage of $(360/N)°$, where N is the number of antenna array panels.

Figure 4:
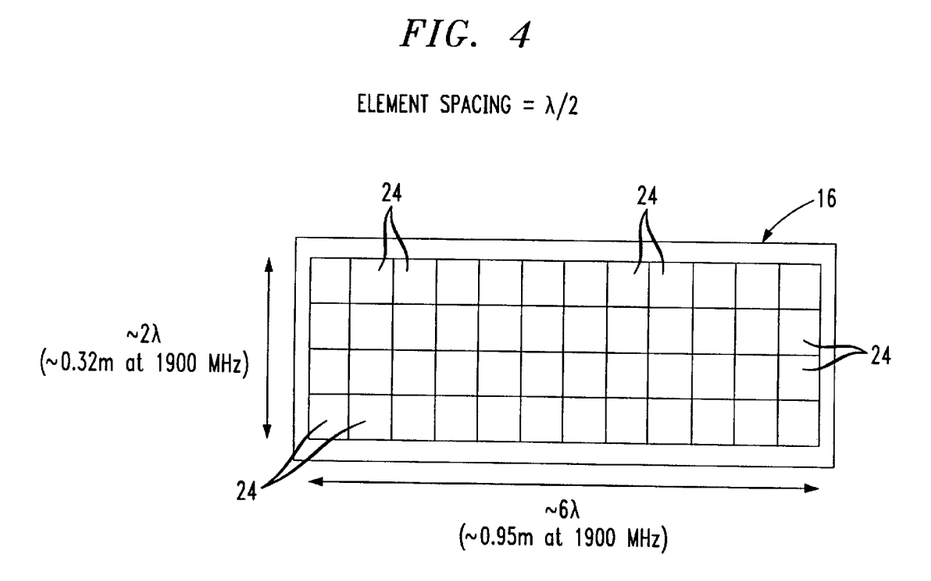
FIG. 4 is an elevation view of an antenna element array panel situated at a base station of the system.
Figure 5:
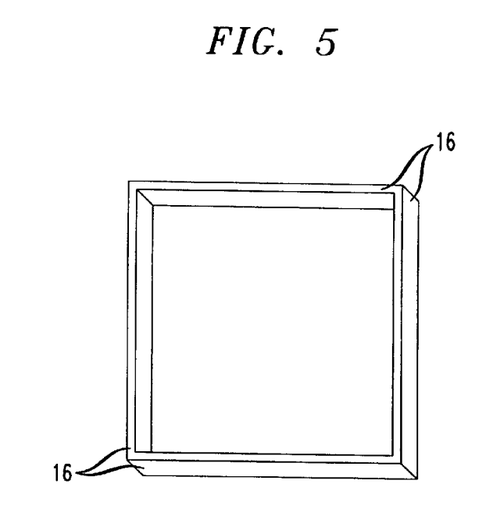
FIG. 5 is a top view of four of the panels in FIG. 4 mounted on corresponding sides of a base station structure.

In the embodiment of FIGS. 1, 4 and 5, four array panels 16 are mounted on corresponding sides of a base station building. Each base antenna array panel comprises a 12×4 array of radiating elements 24 which when suitably driven form an antenna pattern beam approximately 10° in azimuth and 30° in elevation. In the disclosed embodiment, phase centers of the radiating elements 24 are spaced at one-half the wavelength of the operating frequency of the system 10. For example, about 8-cm spacing for an operating frequency of 1900 MHz. A base station 12 is then able to move or electronically "steer" its antenna beam in the direction of a given subscriber station 14 either to transmit information/data to, or to receive information/data from, a user at the subscriber station 14.

Figure 9:
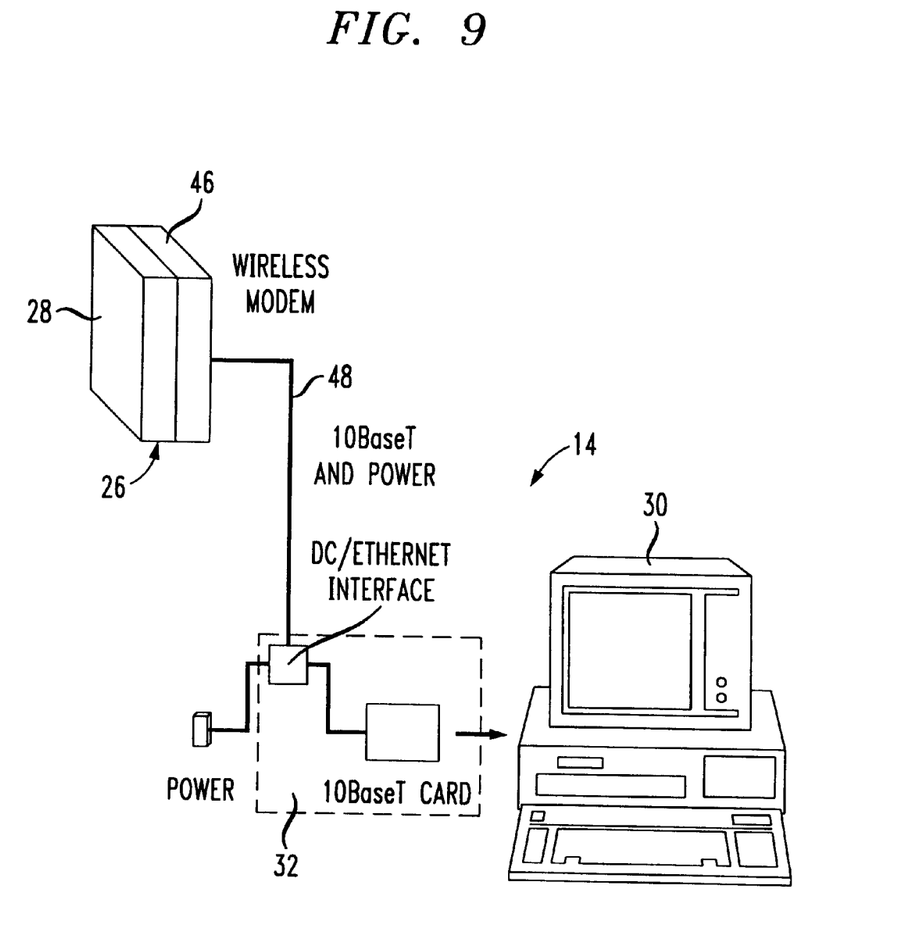
FIG. 9 is a pictorial representation of an entire subscriber station.

Radio frequency (RF) components of a subscriber station may be incorporated within a subscriber "unit" 26 shown in FIG. 9. The unit 26 is mounted, for example, to the side of a subscriber's building, near the roofline of the building. The unit includes an integrated patch antenna array 28 having a pattern which in the illustrated embodiment is fixed in azimuth and in elevation. The subscriber unit 26 also contains the transceiver unit 22 including RF and digital electronic components used for information or data transmission and reception. A connection is made between the subscriber unit 26 and a personal computer (i.e., terminal equipment) 30 using, e.g., a standard Ethernet 10BaseT connection 32. A subscriber station processor exchanges control and data signals with operating components of the subscriber station.

Base Station to Subscriber Transmission Mode

Signal transmissions from a base station 12 to a covered subscriber station 14 in the present embodiment employ square constellation M-ary quadrature-amplitude modulation (QAM). For example, a symbol rate of 800 kHz is used, and a minimum bit rate is defined at $1.6 \times 10^6$ bits/sec (bps) using quadrature phase shift keying (QPSK). Use of a 64-QAM constellation can allow data rates of up to 4.8 Mbps to be transmitted in a 1-MHz channel allotment, provided signal-to-interference (S/I) levels are high enough to ensure quality of service. An 800 kHz symbol rate allows base station downlink signals to remain within a 1-MHz channel bandwidth, with 25% excess bandwidth (800 kHz*1.25=1 MHz). To improve the performance of a receiver of the subscriber transceiver unit 22 (upper portion of FIG. 8) in the presence of multipath downlink signals, a decision feedback equalizer (DFE) 34 is preferably included in a demodulator 36 of the transceiver unit 22. Forward error correction (FEC) coding may also be implemented to improve the performance of the downlink signal transmissions as is known generally in the art.

Subscriber to Base Station

Signal transmissions from a subscriber station 14 to an assigned base station 12 are preferably made using a variable rate, multi-carrier QAM scheme. A minimum data modulation constellation for the transmissions is, for example, 4-ary QAM which is the same as QPSK. The modulation constellation density may be set higher, up to, e.g., 64 QAM if S/I levels permit.

Figure 3:
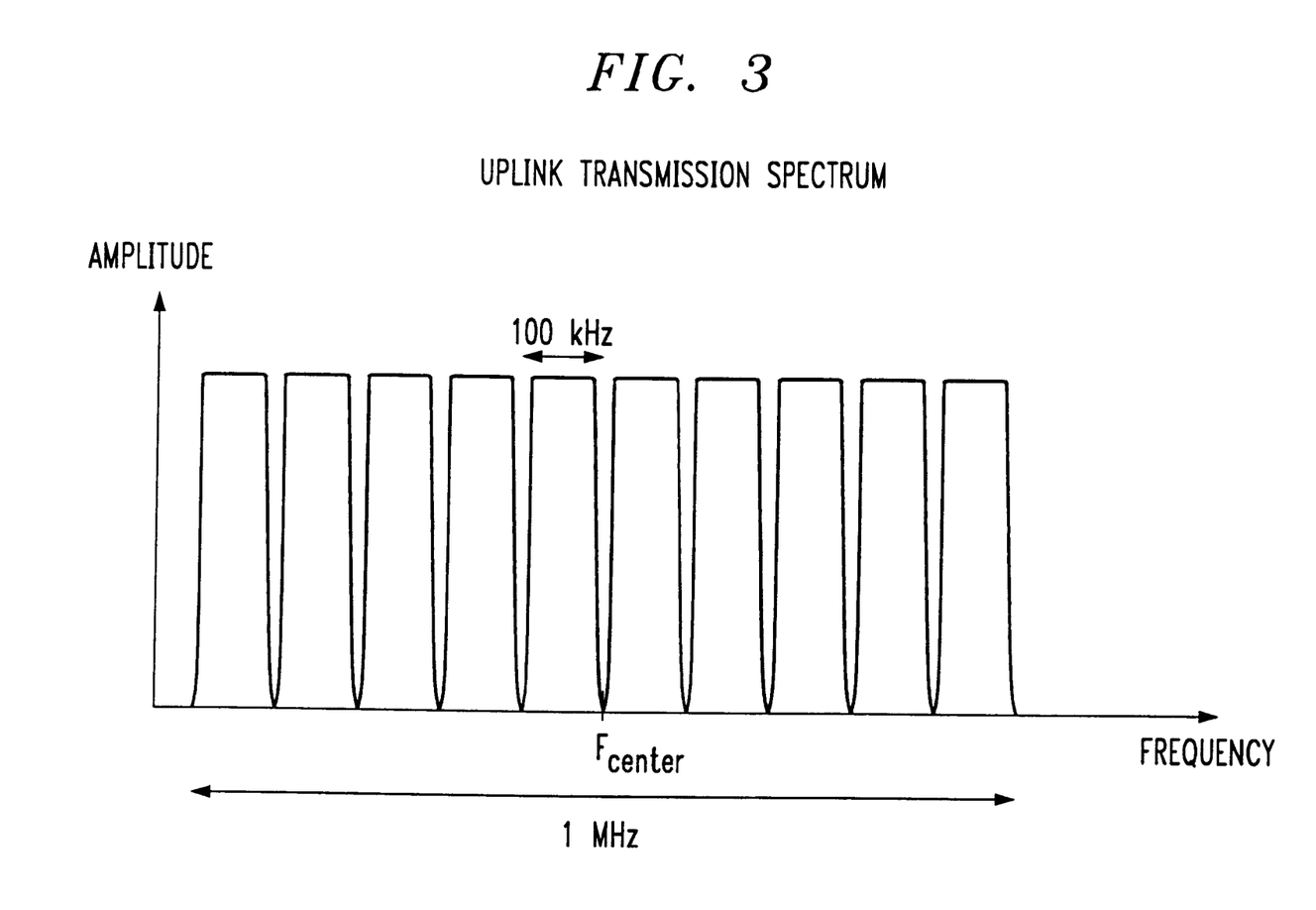
FIG. 3 is a graph of a frequency spectrum allotment for a subscriber station in the system of FIG. 1.

A subscriber station may use, for example, up to ten separate carriers (or "sub-carriers") contained within a typical 1-MHz subscriber frequency band allotment, as shown in FIG. 3, to transmit data via uplink signals to its base station 14. At QPSK rates, each of the carriers will thus carry data at a minimum rate of 160 kbps. Higher order modulation densities will increase the throughput (e.g., 64 QAM provides 6 bits/symbol to yield 480 kbps), if required. Thus, an individual user can aggregate multiple carriers in order to transmit symbol rates higher than 80 kHz.

Importantly, one or more of a subscriber station's available carriers can be used to define a random access channel. A user who is ready to transmit data to his/her base station may, by using the random access channel, request the base station to poll or schedule the user for the data transmission.

An advantage of a multicarrier scheme according to the invention is that it allows multiple subscribers to transmit uplink data signals, simultaneously to a common base station. When a user transmits data in a non-multicarrier (i.e., single frequency channel) system, the channel is occupied for the duration of the transmission. Therefore, another user must wait for the channel to become clear before transmitting his/her own data. In the system 10, if a user requires only a low-rate uplink to send short data requests to the base station (e.g., a mouse click), only one carrier of the user's multicarrier allotment is occupied. Remaining carriers are left open thus allowing the carriers to be available for another subscriber's use.

Another advantage of the multicarrier system 10 is that the need for an equalizer for each base station receiver may be eliminated. That is, delay spreads for a fixed wireless system using narrow beam antenna patterns at both the base and the subscriber stations are typically only a few hundred nanoseconds. Thus, for data transmission at a maximum 80 kHz rate on any one uplink carrier signal, an equalizer is not necessary to compensate for data symbol errors induced by multipath propagation from a subscriber to the base station.

In a preferred embodiment, the multicarrier system 10 incorporates a software radio system using commercially available digital up-conversion filter banks, to permit a transmitter of each subscriber transceiver unit 22 (lower portion of FIG. 8) to originate multiple carrier signals according to the invention. The digital upconverters themselves are constructed and arranged to generate multiple independent data streams on carriers separated in frequency by the allotted carrier spacing (e.g., 100 kHz). Geographic coverage areas are assumed to be substantially circular in shape, with the base stations 12 arranged over a hexagonal grid to minimize overlaps in coverage, as shown in FIG. 1.

Base Station Antenna Array

Each base station antenna array panel 16 has, for example, 48 radiating elements 24 configured in a 12×4 pattern, as shown in FIG. 4. Each set of four vertical elements 24 is coupled to a different one of 12 base transmitters 18 (FIG. 6) and 12 base receivers 20 (FIG. 7). The base receivers and transmitters incorporate beamformers 40, 42 that are constructed and arranged to adjust the phase and amplitude of an RF signal according to a desired synthesis algorithm for transmission, or to an adaptive algorithm for reception. Phase and amplitude weights for each of the 12 vertical sets of antenna array panel elements 24, are preferably hardwired so the weights are not changed through the azimuth (horizontal) pattern beam-forming process.

Calibration of Base Station Antenna Array

To synthesize a narrow beam pattern for a base antenna array panel 16, for transmitting downlink data signals to subscribers, the total RF phase lengths from a base transmitter 18 to each array panel element 24 must be known accurately. Phase accuracy of one degree or better at the operating RF wavelength will ensure that nulls in the array pattern are sufficiently deep (e.g., more than 20 dB) to minimize interference. Only relative phase differences between the array panel elements 24 need be determined, however.

To calibrate relative phase paths between a base transmitter 18 and antenna elements 24 on a given panel 16, any one set of four vertical elements can be used as a calibration source. The array is preferably calibrated at time of assembly, and calibration error due to mechanical variations is negligible when compared to phase variations of cables, amplifiers, and other active and passive elements in the transmitter-antenna path.

A signal is injected periodically into one of the antenna elements (i.e., a reference element) and the relative phase between the reference element and each the other elements 24 is measured. The measured phase difference between any pair of elements is then compared to the known (i.e., spatial) phase difference between the elements, and the calibration process computes corresponding phase offsets to maintain the antenna elements in proper phase alignment. The phase offsets are then used in a weight computation for beam synthesis, are stored in the beamformer, and are adjusted periodically. The calibration period thus may be on the order of hours, without a significant loss in performance of the array between calibration periods.

Subscriber Unit

The subscriber unit 26 in FIG. 9 preferably includes a wireless modem 46. The modem 46 is coupled via a connecting cable 48 to the interface 32 for the user's terminal equipment 30. The terminal equipment can be, for example, a data-only personal computer as shown, or a telephony terminal. The antenna 28 and RF components are housed in a common unit enclosure that is mounted, e.g., to the side of a building or to a mast extending slightly above the highest point of the subscriber's building. The radiation pattern of the subscriber antenna 28 is, for example, about 18° in azimuth and about 18° in elevation.

System Air Interface

The air interface for the system 10 can be specified as follows:

1. For subscriber access—Low rate subscriber access channel, and broad/narrow beam base station antenna patterns.

As described above, a multiple carrier access scheme is implemented for uplink data transmission, using multiple narrowband frequency channels spaced on 100 KHz centers all within a 1-MHz subscriber allotment. See FIG. 3. One of these channels is preferably dedicated as a random access channel on which users wishing to transmit data can signal a request to authenticate, or a request to transmit data, to a base station.

When a base station antenna array is driven to form a narrow beam pattern, it is unlikely that the beam will be pointed or steered to a particular user at the exact moment he/she tries to transmit data to the base station. To allow all users access to the random-access channel at any time, the base station antenna beam must be sufficiently wide always to respond to a signal on the channel from any covered subscriber.

Thus, according to the invention, an antenna beam pattern covering an entire field of view of each base station array panel is synthesized at desired time intervals. For a 90° field of view for each array panel, the gain of the panel is reduced about 9 dB. Any loss of signal-to-noise performance due to this antenna gain reduction can be compensated for by setting the subscriber transmission rate to, e.g., one-tenth the normal rate, or about 10 k symbols per second. The actual bit rate will depend on the modulation scheme and constellation density.

Users located near their base station and having a high signal-to-noise ratio, may nevertheless be able to maintain a high density QAM constellation when in a random access channel mode of operation. Users further away, or those having a poor signal-to-noise ratios, may have to switch to a QPSK modulation constellation to ensure reception when the base station antenna pattern is widened to service the random access channel. An access protocol suitable for use on the random access channel of the system 10, is preferably based on an "ALOHA" protocol well-known to those skilled in the art.

A downlink "beacon" signal from each base station should provide authentication, acknowledgment, and access information to subscriber stations. The signal preferably occupies a fixed length time slot, and should be transmitted periodically using the broad (e.g., 4×90°=360°) base station antenna pattern to ensure that all subscribers will receive the beacon signal. The base station information transmission rate for the beacon signal is preferably reduced by the amount necessary to compensate for loss of antenna gain, relative to the gain when in a narrow-beam downlink data transmission mode.

2. For Subscriber Data Transmission and Reception—Packetized traffic/data channel modulation, and subscriber antenna pattern.

Message data or traffic from a subscriber station 14 is transmitted to a base station 12, preferably using an m-ary QAM modulation scheme on one or more uplink carrier signals. If the amount of data, or the subscriber's data rate requirement is low, then only one 100 KHz wide channel may suffice for the subscriber's needs. If a higher data rate is required, then multiple, 100 KHz spaced carriers are requested by the user. As mentioned, data can be transmitted at a symbol rate of 80 KHz on each uplink carrier, and the data rate can vary from 160 kbps to 480 kbps, depending on the modulation constellation density.

EXAMPLE OF SYSTEM SUBSCRIBER CALL SET UP PROCEDURE

A procedure to initiate a call or "session" by a user at a subscriber station, begins with the user initiating a request for service to its base station. The subscriber unit receives the beacon signal during an assigned time slot from the base station, and transmits on the uplink random access channel. If the subscriber's random access transmission is not corrupted by a collision with another transmission from another subscriber on the common channel, the base station will acknowledge the subscriber's request using the base station's broad beam messaging channel.

Once authentication data is exchanged between the subscriber and the base stations, the base station directs a narrow beam toward the subscriber station by adjusting complex weights in the base station's beamformer. For reception at the base station, array weights are computed via an adaptive algorithm, and the output of the adaptive algorithm is used to compute the downlink direction. That is, the base station processes RF signals received by the sets of spaced elements on its antenna array panels, and computes the direction from which a subscriber's signal originates. For downlink transmissions from the base station, the array weights are either precomputed and stored for subscribers who have used the system over a period of time, or the weights are computed based on the direction of arrival of the subscriber's signal per the mentioned adaptive algorithm. As additional users request service, the narrow antenna beam of the base station is steered to cover all transmitting subscribers, to allow them to transmit data to the base station using the described multi-carrier scheme.

In sum, the system 10 provides the following desirable features:

1. A steerable beam antenna at each base station and periodically operating with a wide-beam "beacon" pattern.

2. A dual mode transmission scheme, viz., a fast single carrier downlink, and a parallel multicarrier uplink.

3. A packet radio scheme can be used for both of the up and the down links.

4. A desired user bandwidth on demand available in the uplink; simultaneous uplink transmissions from multiple users (locations).

5. Block radio detection can be implemented at the base stations.

6. QPSK modulation or a higher level QAM is selected according to the S/I conditions of users.

While the foregoing description represents a preferred embodiment of the invention, it will be obvious to those skilled in the art that various changes and modifications may be made, without departing from the true spirit and scope of the invention pointed out by the following claims.

We claim:

1. A base station having a defined geographic coverage area in a wireless communication system, comprising:

a base receiver, a base transmitter, and a base antenna array coupled to the base receiver and the base transmitter;

a base station beamformer associated with the base antenna array;

a base station processor configured to exchange control and data signals with operating components of the base station;

wherein the processor and the beamformer are configured to operate periodically in one of:

a first mode wherein the base antenna array defines a broad base antenna beam during a first time interval in which the base transmitter transmits first downlink signals including beacon or acknowledgment signals to a number of subscriber stations over the coverage area wherein the beacon or ackknowledgment signals as are modulated on a base carrier having a known radio frequency, and the base receiver receives first uplink signals including random access signals from the subscriber stations at different locations within the coverage area via the broad base antenna beam, or a second mode wherein the base antenna array steers a narrow base antenna beam in the direction of an acknowledged subscriber station in the coverage area of the base station during a second time interval, in which the base transmitter transmits second downlink signals including base data or traffic signals to the acknowledged subscriber station, wherein the base data or traffic signals are modulated on the base carrier having said known radio frequency and the base receiver receives second uplink signals including subscriber data or traffic signals from the subscriber station, via the narrow base antenna beam;

the base receiver is configured to receive the second uplink signals including the subscriber data or traffic signals from the acknowledged subscriber station modulated on one or more subscriber carriers that are transmitted simultaneously with one another from the acknowledged subscriber station, wherein the subscriber carriers have radio frequencies that are selected from among a number of spaced subscriber frequencies within a given frequency spectrum allotment for subscriber stations of the communication system so that the subscriber carriers define corresponding subscriber channels each of a certain bandwidth, and one or more available subscriber carriers are aggregated to meet a desired transmission bandwidth requirement for the subscriber station.

2. A base station according to claim 1, wherein the base receiver is configured to receive, in the first mode, the random access signals from the subscriber stations over the coverage area of the base station at a first subscriber transmission rate, and to receive, in the second mode, the subscriber data or traffic signals from the acknowledged subscriber station at a second subscriber transmission rate.

3. A base station according to claim 2, wherein the first subscriber transmission rate is lower than the second subscriber transmission rate by an amount sufficient to compensate for a lower gain of the broad antenna beam with respect to the narrow antenna beam.

4. A base station according to claim 1, wherein the base transmitter is configured to transmit the beacon or acknowledgment signals as said first downlink signals to the subscriber stations in the first mode over said coverage area at a first transmission rate, and to transmit the base data or traffic signals as said second downlink signals to the acknowledged subscriber station in the second mode at a second base transmission rate.

5. A base station according to claim 4, wherein the first base transmission rate is lower than the second base transmission rate by an amount sufficient to compensate for a lower gain of the broad antenna beam with respect to the narrow antenna beam.

6. A base station according to claim 1, wherein the base transmitter is configured to transmit the first and the second downlink signals to one or more subscriber stations by modulating a single carrier.

7. A base station according to claim 1, wherein the base antenna array and the base station processor are constructed and arranged to compute a direction from which an uplink signal from the acknowledged subscriber station originates, and the processor controls the base station beamformer to steer the narrow antenna beam in the direction of the acknowledged subscriber station.

8. A base station according to claim 7, wherein the base antenna array comprises a panel having an array of radiating elements.

9. A base station according to claim 7, wherein the base antenna array comprises at least three panels each of which has an array of radiating elements, to provide substantially 360-degree azimuth coverage.

10. A subscriber station for deployment in a wireless communication system, comprising:

a subscriber receiver, a subscriber transmitter, and a subscriber antenna coupled to the subscriber receiver and the subscriber transmitter;

a subscriber station processor configured to exchange control and data signals with operating components of the subscriber station;

the subscriber receiver is configured to receive periodically a single base carrier at a known radio frequency on which (a) beacon or acknowledgment signals are modulated at a system base station during a first time interval, or on which (b) base data or traffic signals are modulated at the system base station during a second time interval;

said subscriber transmitter is constructed and arranged to transmit signals via the subscriber antenna to the system base station on one or more subscriber carriers having radio frequencies that are selected from among a number of spaced subscriber frequencies within a given frequency spectrum allotment for all subscriber stations of the communication system;

a first subscriber carrier produced by the subscriber transmitter corresponds to a random access channel over which the subscriber station transmits access signals to the base station during said first time interval to pole or schedule the subscriber station for data or traffic transmission; and one or more second subscriber carriers are selected for transmission of subscriber data or traffic signals to the base station, wherein the second subscriber carriers are transmitted simultaneously with one another during a second time interval and define corresponding subscriber channels each of certain bandwidth, and wherein available ones of the second subscriber carriers are aggregated to meet a desired transmission bandwidth requirement for the subscriber station.

11. A subscriber station according to claim 10, wherein the subscriber transmitter is arranged to transmit the access signals on the first carrier at a first subscriber transmission rate, and to transmit subscriber data or traffic signals on each of the second carriers at a second subscriber transmission rate.

12. A subscriber station according to claim 11, wherein the first subscriber transmission rate is lower than the second subscriber transmission rate by an amount sufficient to compensate for a lower gain broad antenna beam at the base station for receiving the first carrier, with respect to a higher gain narrow antenna beam at the base station for receiving the second carriers.

13. A subscriber station according to claim 10, wherein the subscriber receiver is arranged to receive the beacon or acknowledgment signals modulated on the single RF carrier from the base station at a first base transmission rate, and to receive the base data or traffic signals modulated on the the single RF carrier from the base station at a second base transmission rate.

14. A subscriber station according to claim 13, wherein the first base transmission rate is lower than the second base transmission rate by an amount sufficient to compensate for a lower gain broad antenna beam at the base station that transmits the beacon or acknowledgment signals, with respect to a higher gain narrow antenna beam at the base station that transmits the base data or traffic signals.

15. A subscriber station according to claim 10, wherein the subscriber receiver, the subscriber transmitter and the subscriber antenna are in the form of a wireless modem unit for mounting on a subscriber building.

16. A subscriber station according to claim 15, including subscriber terminal equipment and an interface for coupling the terminal equipment to the wireless modem unit.

17. A wireless communication system, comprising:
   a base station including;
      a base receiver, a base transmitter, and a base antenna array coupled to the base receiver and the base transmitter;
      a base station beamformer associated with the base antenna array; and
      a base station processor configured to exchange control and data signals with operating components of the base station;
   one or more subscriber stations within a geographic coverage area of the base station, wherein each subscriber station includes;
      a subscriber receiver, a subscriber transmitter, and a subscriber antenna coupled to the subscriber receiver and the subscriber transmitter; and
      a subscriber station processor configured to exchange control and data signals with operating components of the subscriber station;
   wherein the base station processor and beamformer are configured to operate periodically in one of:
      a first mode wherein the base antenna array defines a broad base antenna beam during a first time interval in which the base transmitter transmits first downlink signals including beacon or acknowledgment signals to subscriber stations within the coverage area wherein the beacon or acknowledgment signals are modulated on a base carrier having a known radio frequency, and the base receiver receives first uplink signals including random access signals from the subscriber stations at different locations within the coverage area via the broad base antenna beam, or
      a second mode wherein the base antenna array steers a narrow base antenna beam in the direction of an acknowledged subscriber station during a second time interval in which the base transmitter transmits second downlink signals including base data or traffic signals to the acknowledged subscriber station, wherein the base data or traffic signals are modulated on the base carrier of said known radio frequency and the base receiver receives second uplink signals including subscriber data or traffic signals from the subscriber station via the narrow base antenna beam; and the second mode; and
   the base receiver is configured to receive the second uplink signals including the subscriber data or traffic signals from the acknowledged subscriber station modulated on one or more subscriber carriers that are transmitted simultaneously with one another from the acknowledged subscriber station, wherein the subscriber carriers have radio frequencies that are selected from among a number of subscriber frequencies within a given frequency spectrum allotment for subscriber stations of the communication system so that the subscriber carriers define corresponding subscriber channels each having a certain bandwidth, and one or more available subscriber carriers are aggregated to meet a desired transmission bandwidth requirement for the subscriber station.

18. A communication system according to claim 17, wherein the subscriber receiver is configured to receive the single base carrier at the known radio frequency on which (a) the beacon or acknowledgment signals or (b) the base data or traffic signals are modulated at the base station at corresponding time intervals.

19. A communication system according to claim 17, wherein the base antenna array and the base station processor are constructed and arranged to compute a direction from which an uplink signal from the acknowledged subscriber station originates, and the base station processor controls the base station beamformer to steer the narrow antenna beam in the direction of the acknowledged subscriber station.

20. A communication system according to claim 19, wherein the base antenna array comprises a panel having an array of radiating elements.

21. A communication system according to claim 19, wherein the base antenna array comprises at least three panels each of which has an array of radiating elements, to provide substantially 360-degree azimuth coverage.

22. A communication system according to claim 17, wherein the subscriber receiver, the subscriber transmitter and the subscriber antenna are in the form of a wireless modem unit for mounting on a subscriber building.

23. A communication system according to claim 22, including subscriber terminal equipment and an interface for coupling the terminal equipment to the wireless modem unit.

* * * * *